United States Patent [19]

Schwab

[11] 4,340,301

[45] Jul. 20, 1982

[54] RETROREFLECTOR PLATE AND A METHOD FOR ITS MANUFACTURE

[75] Inventor: Kurt Schwab, Mils, Austria

[73] Assignee: D. Swarovski & Co., Wattens, Austria

[21] Appl. No.: 210,231

[22] Filed: Nov. 25, 1980

[30] Foreign Application Priority Data

Nov. 27, 1979 [DE] Fed. Rep. of Germany ....... 2947719
Mar. 27, 1980 [DE] Fed. Rep. of Germany ....... 3011955

[51] Int. Cl.[3] .............................................. G02B 5/13
[52] U.S. Cl. .................................. 350/106; 350/109
[58] Field of Search ........... 350/109, 107, 108, 97–106

[56] References Cited

U.S. PATENT DOCUMENTS

| | | | |
|---|---|---|---|
| 2,180,093 | 11/1939 | Persons | 350/106 |
| 2,243,434 | 5/1941 | Menke | 350/106 |
| 2,330,097 | 9/1943 | Waters | 350/106 |
| 3,449,158 | 6/1969 | Rowland | 350/106 |
| 3,963,309 | 6/1976 | Schwab | 350/104 |

*Primary Examiner*—R. A. Rosenberger
*Attorney, Agent, or Firm*—Schwartz, Jeffery, Schwaab, Mack, Blumenthal & Koch

[57] ABSTRACT

A retroreflector plate and a method for its manufacture are described.

The retroreflector plates consist of a transparent plate with a reflective rear side, the front side of which comprises adjacently disposed, curved light incidence surfaces, and the rear side of which comprises adjacently disposed, curved reflection surfaces, in which case the optical axis of each individual light incidence surface coincides with the optical axis of a respective reflection surface.

The retroreflector plates are distinguished by the fact that, when the light incidence surfaces or the reflection surfaces are projected perpendicular and parallel onto the plate surface, as the plane of horizontal projection, the outlines of the reflection surfaces comprise different surface content, when compared with each other and with the light incidence surfaces, or, the outlines of the light incidence surfaces and their respective reflection surfaces substantially comprise the same surface content, while having different contour shapes.

The retroreflector plates are further distinguished by the highest possible luminous values and at the same time by a wide angle range of reflection.

16 Claims, 14 Drawing Figures

A-A

RETROREFLECTOR PLATE AND A METHOD FOR ITS MANUFACTURE

This invention concerns a retroreflector plate and a method for its manufacture.

Retroreflector plates are known, in the case of which a multiple of glass spherical reflector elements are inserted into and comprised in a plastic plate. One disadvantage of these known retroreflector plates is that their manufacture is expensive, comprising manufacturing a large number of individual spherical reflector elements and inserting them in a plastic plate.

A much graver drawback is, however, the low luminous intensity of the known retroreflector plates. Retroreflectors, which are used in road and highway traffic, must also be capable of retroreflecting obliquely incident light rays, particularly within the angle ranges prescribed by the authorities. In the case of the known reflectors this can only be achieved by selecting the diameter of the reflection surface of the individual spherical reflector elements such that it is larger than that of the light incidence surface. This, however, implies that the individual elements cannot be continuously adjacently combined with respect to the light incidence side. Moreover, plastic webs must also be provided on the reflector side, between the individual reflectors, so as to provide for the necessary embedment of the elements in the plastic plate. This leads to a further grave reduction of the optically active surface. For the reasons mentioned above, only about one third of the total surface of the retroreflector plates used in practical operation is optically exploited, i.e. is optically active. Continuous adjacent combination of the individual spherical reflector elements implies, on the other hand, that the configuration of the individual reflection surfaces would have to correspond to that of the light incidence surfaces, with the result that the official requirements as regards angle values could not be met.

German print DE-OS No. 1,622,012 recites a reflector which has neither its front side nor its rear side completely covered with light incidence or reflection surfaces respectively, so that optically inactive areas are present between the surfaces. This necessarily leads to reduced luminous intensity. Moreover, the light incidence surfaces have the same design as the reflection surfaces. Obliquely incident light rays which thus fail to impinge the reflection surface cannot be reflected. Reflection within a wide angle range can therefore not be achieved with such a design.

The reflector described in Austrian Pat. No. 332,763 comprises total surface covering but is, however, equally unsatisfactory with respect to the angle values, since in the case of this reflector just as few obliquely incident light rays are retroreflected.

The reflector described in German print DE-OS No. 1,932,259 is better with respect to the angle range of reflection, since the reflection surfaces are larger than the light incidence surfaces. Complete covering of the light incidence side is, however, not possible with such reflector elements, if it is assumed that the reflection surfaces are to be completely covered, so that in this case optically inactive areas are present on the light incidence side, and these lead to reduced luminous intensity.

Various embodiments of light incidence surfaces and reflection surfaces are described in U.S. Pat. No. 2,243,434. However, full surface covering is not provided for in the case of these reflectors and reflection cannot be achieved within extensive angle ranges.

The known reflectors have not been capable heretofore of combining the requirement as regards extensive angle ranges with the requirement with respect to high luminous intensity. The known reflectors are either incapable of retroreflecting obliquely incident light rays, which is, however, necessary for many applications, or, on the other hand, the luminous intensity is not high, because the light incidence surface is not completely covered so as to be optically active.

It is therefore the object of the invention to provide a retroreflector plate which guarantees the highest possible degree of luminous intensity and which produces retroreflection within a wide angle range of reflection.

In accordance with the invention this object is solved by means of a retroreflector plate, consisting of a transparent plate with a reflective rear side, the front side of which comprises adjacently disposed, curved light incidence surfaces, and the rear side of which comprises adjacently disposed, curved reflection surfaces, in which case the optical axis of each individual light incidence surface coincides with the optical axis of a respective reflection surface, wherein the outlines of said reflection surfaces comprise different surface content when compared with each other and with the light incidence surfaces, when said light incidence surfaces or said reflection surfaces are projected perpendicular and parallel onto the plate surface, as the plane of horizontal projection.

In accordance with an alternative embodiment of the invention, this object is solved by means of a retroreflector plate, consisting of a transparent plate with a reflective rear side, the front side of which comprises adjacently disposed, curved light incidence surfaces, and the rear side of which comprises adjacently disposed, curved reflection surfaces, in which case the optical axis of each individual light incidence surface coincides with the optical axis of a respective reflection surface, wherein the outlines of said reflection surfaces and their respective light incidence surfaces in each case substantially comprise the same surface content, while having different contour shapes, when said light entrance surfaces or said reflection surfaces are projected perpendicular and parallel onto the plate surface, as the plane of horizontal projection.

The first embodiment example will now be described in detail in the following. In this embodiment, the reflector plate preferably comprises two differently embodied reflection surfaces.

In order to obtain the highest degree of luminous intensity, the front side of the light incidence surfaces and the rear side of the reflection surfaces are substantially completely covered.

The light incidence surfaces preferably comprise a hexagonal outer contour shape.

In this case, the surface content and outer contour shape of the light incidence surfaces or reflection surfaces are with respect to the outlines as produced when the light incidence surfaces or reflection surfaces are projected perpendicular and parallel onto the surface of the plate, as the plane of horizontal projection.

In the case of the known reflector plates, the light incidence surface either corresponds to the reflection surface or the light incidence surface is smaller than the corresponding reflection surface, i.e. its dimensions are drawn into the design of the latter. In contrast to this, the inventive retroreflector plates are distinguished by the fact that the light incidence surfaces are to some extent larger than the reflection surfaces, i.e. their dimensions are not drawn into the design of the latter.

The present invention is based on the concept that a given reflection surface on the reflection side does not cover the area which is given by the corresponding light incidence surface, including any inactive area present, but instead extends beyond it at the cost of the adjacent reflection surfaces. This leads to the fact that, by way of example, smaller and larger reflection surfaces respectively or rows with smaller and larger reflection surfaces alternate.

In this manner, retroreflection can also be attained in the case of very obliquely incident light rays, i.e. in the case of wide angle ranges, since the large reflection surfaces, whose dimensions are substantially larger, at least in one direction, as compared to the corresponding light incidence surface, also reflect light in the case of extreme angles of incidence. In contrast to this, the small reflection surfaces reflect within a narrower angle range, however within the range within which the main portion of the light impinges. The inventive retroreflector plates ensure complete covering of both the light incidence side and the reflection side, so that the highest degree of luminous intensity can be attained.

It is preferred that two differently embodied reflection surfaces be provided. In the case of complete surface covering this means that, under normal circumstances, the two differently embodied reflection surfaces together have substantially the same content as the two associated light incidence surfaces.

The light incidence surfaces and the reflection surfaces may have the same contour shape, for instance the shape of hexagons. A different contour shape may, however, also be considered. By way of example, the light incidence surfaces may be squares and the reflection surfaces octagons and squares.

In the case of the second embodiment example, the light incidence surfaces preferably exhibit a hexagonal, square or rectangular contour shape, while the reflection surfaces exhibit a rectangular contour shape.

The reflection side of the plate preferably comprises complete surface covering with individual adjacently disposed reflection surfaces. The surface content of the reflection surfaces is equal to that of the light incidence surfaces, the two surfaces, however, having different contour shapes.

By varying the contour shape of the reflection surfaces as compared to the light incidence surfaces, the reflection areas can be varied in a simple manner, and the reflector can thus be adapted simply to meet the required or desired conditions. This optical system allows for most extensive variation of the reflection areas, while retaining high luminous values, and can thus be adapted to given circumstances and specifications.

Both embodiment examples coincide with each other in that the light incidence side is completely covered with individual adjacently disposed, curved light incidence surfaces. This ensures that the total light impinging the reflector can be retroreflected, which would not be the case if dead, i.e. optically inactive areas, were to be present between the individual light incidence surfaces. Complete surface covering is possible, particularly with squares, rectangles, parallelograms and hexagons.

The teachings in accordance with the first and second embodiment examples may also be applied in combination. By way of example, this can be done by providing the reflection surface in accordance with the teaching of the second embodiment example as compared to the light incidence surface with a different contour shape, e.g. a longitudinally extended contour shape. In accordance with the teaching of the first embodiment example, in addition, a portion of the reflection surfaces, e.g. every second surface or every second row, may be enlarged with respect to their surface content, at the cost of the adjacent reflection surfaces, and in this manner the angle range of reflection can be extended further.

A reflection surface is associated with each light incidence surface, and the optical axes of corresponding surfaces coincide.

Normally, the optical axes will be perpendicular to the reflector plate. For certain applications, for example for ground markings, it may be advantageous to arrange the optical axes at an angle to the perpendicular to the retroreflector plate, so as to thus attain a heterogeneous characteristic line of reflection.

The reflection side of the plate preferable also comprises complete surface covering with individual adjacently disposed reflection surfaces.

In many instances, for example in the case of retroreflectors used in road and street traffic, optical activity within given angle ranges is required. By way of example, the angle range with respect to the horizontal plane must be very wide, but may, however, be relatively small in the vertical plane. Such requirements can be fulfilled very well and in a very simple manner with the inventive retroreflector plates. The angle ranges within which the reflector is optically active are approximately proportional to the dimensions of the reflection surfaces. By varying the contour shape of the surfaces, for instance by providing reflection surfaces in the shape of longitudinally extended hexagons, or, in other words, by varying the surface content of the reflection surfaces, it is thus possible to provide preferred areas and to ensure, for instance, optical activity in the horizontal plane within substantially increased angle ranges. This adaptation to required or desired angle ranges is possible with the means of the invention, while at the same time complete surface covering is retained both on the incidence side and on the reflection side.

In order to provide preferred areas for retroreflection, a particular design of the planar geometry of the light incidence surfaces may be considered, for example in the form of longitudinally extended hexagons, or the grid in which the elements are arranged may also be varied. With such embodiment developments, in the case of which complete surface covering is provided on both sides, extreme angle ranges can be exploited.

The inventive retroreflector plates are distinguished by an optimum characteristic line of reflection, because both the light entrance surfaces and the reflection surfaces can be simply varied with respect to each other and the grid arrangement of the reflection areas can also be simply varied by varying the planar geometry. Thus the reflector can be ideally adapted to meet the required or desired conditions. This optical system allows for most extensive variation of the reflection areas, while retaining extremely high luminous values.

The manufacture of the retroreflector plate is extremely simple and economical.

For technical reasons of manufacture it may be advantageous to round off or flatten the corners of the curved reflection surfaces, whereby the incidence behaviour is only affected in extreme ranges. The advantages as regards manufacture may, however, justify this negligible affect as regards the optical system.

The retroreflector plates may be applied in very different fields and are suitable particularly for use in road and street traffic, due to their optical system and their insensitivity as regards adverse weather affects.

The invention will now be described in the following with reference to the drawing which illustrates embodiment examples and in which FIG. 1 shows a plan view of a retroreflector plate as viewed from the light incidence side, FIG. 2 shows a plan view of the retroreflector plate in accordance with FIG. 1, as viewed from the reflection side, FIG. 3 is a sectional view along the line A—A in FIG. 1, FIG. 4 shows a plan view of further reflector plate as viewed from the light incidence side, FIG. 5 shows a plan view of the reflector plate in accordance with FIG. 4, as viewed from the reflection side, FIG. 6 is a sectional view along the line A—A in FIG. 4, FIG. 7 is a sectional view through a reflector plate, FIG. 8 is a plan view of a retroreflector plate as viewed from the light incidence side, in the case of which the invisible reflection surfaces are partly illustrated, FIG. 9 shows a plan view of the retroreflector plate as viewed from the reflection side, FIG. 10 is a sectional view along the line A—A in FIG. 8, FIG. 11 is a sectional view along the line B—B in FIG. 8 and FIGS. 12, 13 and 14 show the outer contour shapes of superimposed light incidence surfaces and reflection surfaces in accordance with various embodiment examples.

FIGS. 1 to 7 illustrate the first embodiment example.

The retroreflector plate 1 illustrated in FIG. 1 bears on its front side three light incidence surfaces 4*a*, 4*b* in the shape of hexagons.

The light incidence surfaces 4*a*, 4*b* may be the same in all cases, but they may also be embodied differently for reasons will be explained hereinafter.

Each light incidence surface 4*a*, 4*b* is associated with a reflection surface 5*a*, 5*b*, and the respective optical axes 6, 7 coincide. (The invisible reflection surfaces are dash-lined in FIG. 1).

FIG. 2 shows the rear side 2 of the retroreflector plate 1 with reflection surfaces 5*a*, 5*b*, in the case of which the surface content of the reflection surfaces 5*a* is substantially larger than that of the reflection surfaces 5*b*.

FIG. 3 is a sectional view along the line A—A of FIG. 1. The light incidence surfaces 4*a*, 4*b* are shown on the front side 3 of the retroreflector plate 1, and the reflection surfaces 5*a*, 5*b* are shown on the rear side 2. The optical axis 6 of the light incidence surfaces coincides with the optical axis 7 of the reflection surfaces. The incident light ray 10 is reflected parallel from the reflective layer 9.

FIGS. 4, 5 and 6 illustrate further examples, in the case of which the light incidence surfaces 4*a*, 4*b* have the shape of squares, while the reflection surfaces 5*a*, 5*b* have the counter shape of octagons and squares.

As shown in FIG. 4, the corners of the squares may be cut away, because of the different curvature of the light incidence surfaces.

The second embodiment example will be explained in detail in the following with reference to FIGS. 8 to 14.

The retroreflector plate 1 shown in FIG. 8 comprises on its front side 3 light incidence surfaces 4 in the form of regular hexagons.

Each light incidence surface 4 is associated with a reflection surface 5, and the respective optical axes 6, 7 coincide.

The rectangular reflection surfaces 5 correspond, with respect to their surface content, to the hexagonal light incidence surfaces 4, and the narrow side of the rectangle has a length corresponding to half the distance between two parallel sides of a hexagon, while the long side of the rectangle corresponds to the sum of the hexagonal diameter plus the hexagonal edge length.

The degree of optical activity is determined by the dimensions of the reflection surfaces. The angle ranges within which reflection takes place are proportional to the lengths of the rectangles.

FIG. 9 shows the rear side 2 of the retroreflector plate 1 with the rectangular reflection surfaces 5.

FIG. 10 is a sectional view along the line A—A of FIG. 8. The light incidence surfaces 4 are shown on the front side 3 of the retroreflector plate 1, and the reflection surfaces 5 are shown on the rear side 2. The optical axis 6 of the light incidence surfaces coincides with the optical axis 7 of the reflection surfaces. The incident light ray 10 is reflected parallel from the reflective layer 9. The portions between the light incidence surfaces 4 are produced by the guidance of the cut through the tangent line between two hexagons in the case of each second row of hexagons.

FIG. 11 is a sectional view along the line B—B of FIG. 8. A comparison between FIGS. 3 and 4 will clearly show the different embodiment of the hexagonal light incidence surfaces 4 and the rectangular reflection surfaces 5.

Figure 14:
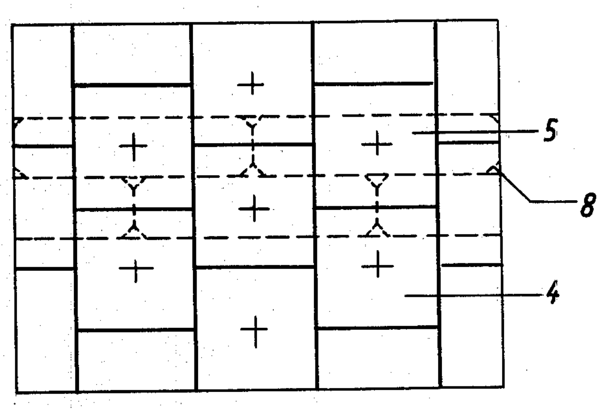

FIG. 14 shows square light incidence surfaces 4 and rectangular reflection surfaces 5. It will be clear that the dimensions of the rectangular reflection surfaces can be varied within extreme limits when the light incidence surfaces are embodied in the form of squares or rectangles. When embodying the light incidence surfaces in the form of rectangles or squares, it is necessary to offset every second row of squares or rectangles, and the mid-points of the light incidence surfaces may not lie in one line in the direction in which the longitudinal side of the rectangle of the reflection surfaces lies.

FIG. 14 also indicates that the corners 8 of the rectangular reflection surfaces 5 may be rounded off or cut away.

The optical system of reflector elements, on which the optical system of the inventive retroreflector plate is based is known, so that no further explanation is necessary in this regard. By way of example, this optical system is described in the aforementioned patents.

The light incidence surfaces may be spherically or non-spherically curved. The reflection surfaces normally also exhibit spherical curvature. The curvature of the light incidence surfaces is dependent on the index of refraction of the material used and on the desired dispersion of the reflecting light.

Figure 7:
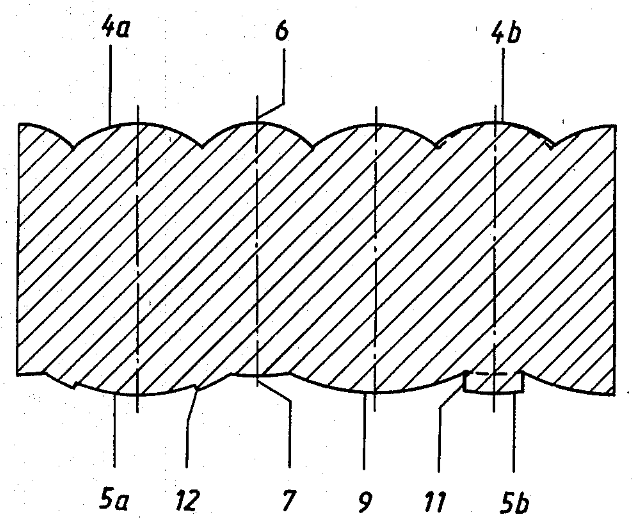
Figure 8:
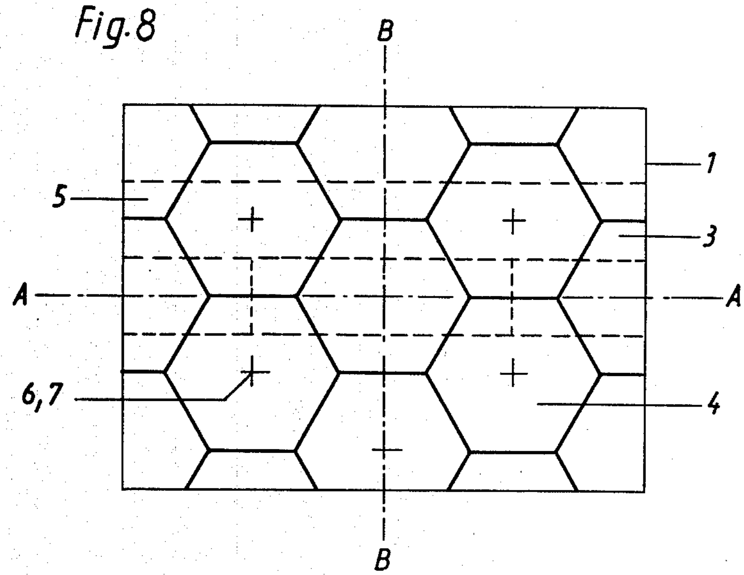
Figure 9:
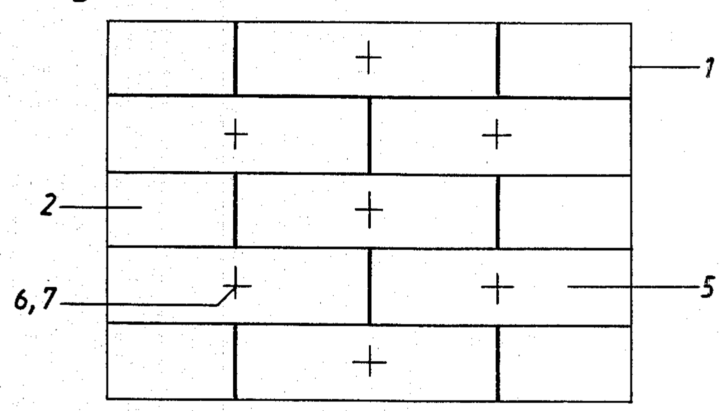
Figure 10:
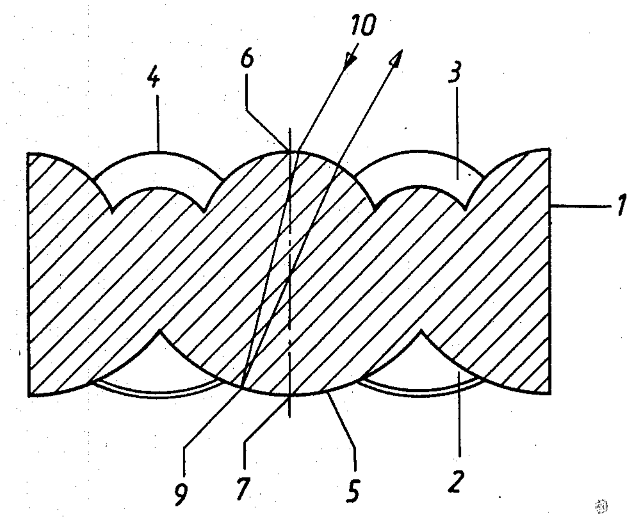
Figure 11:
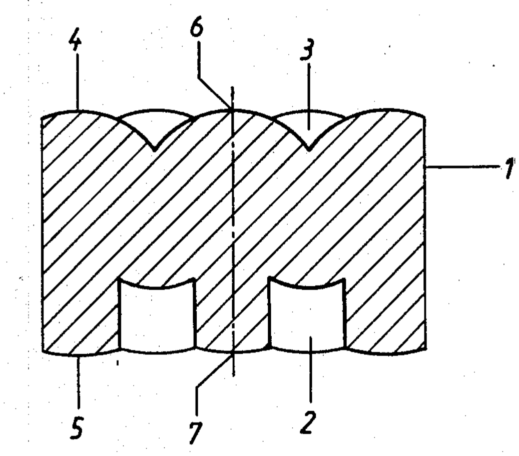
Figure 12:
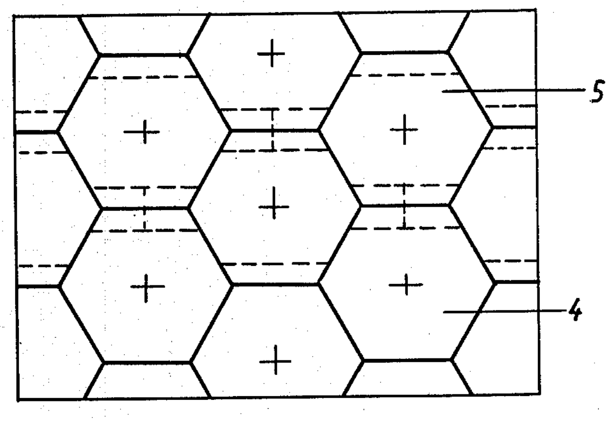
FIG. 12 shows a further example, in the case of which the light incident surfaces 4 have the form of regular hexagons, while the reflection surfaces 5 have the contour shape of irregular hexagons with laterally adjoining rectangles.
Figure 13:
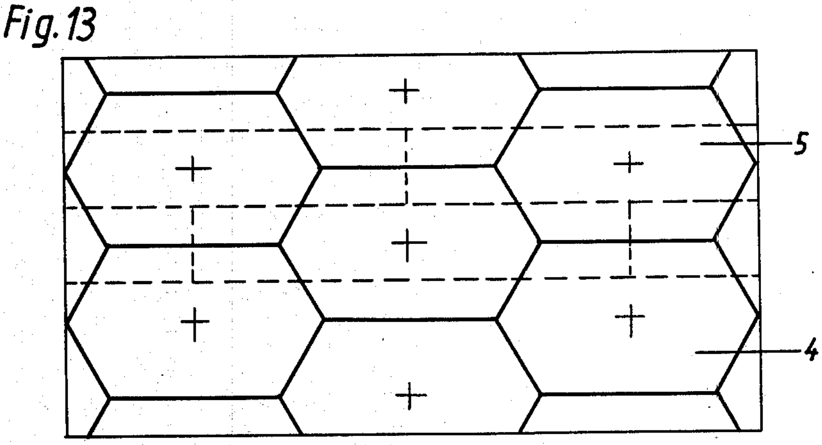
FIG. 13 shows an example in which the light incidence surfaces 4 are longitudinally extended hexagons and the reflection surfaces 5 are very long rectangles. In these or similar embodiment examples, in the case of which the light incidence surfaces are extended in one direction, extreme angle ranges can be exploited when both sides exhibit complete surface covering.

For large angles of incidence, e.g. larger than 25°, the embodiment of the reflection surfaces as dynamically balanced step mirrors may be advantageous. This is illustrated in FIG. 7, where a reflection surface 5a is embodied as a step mirror 12.

Figure 1:
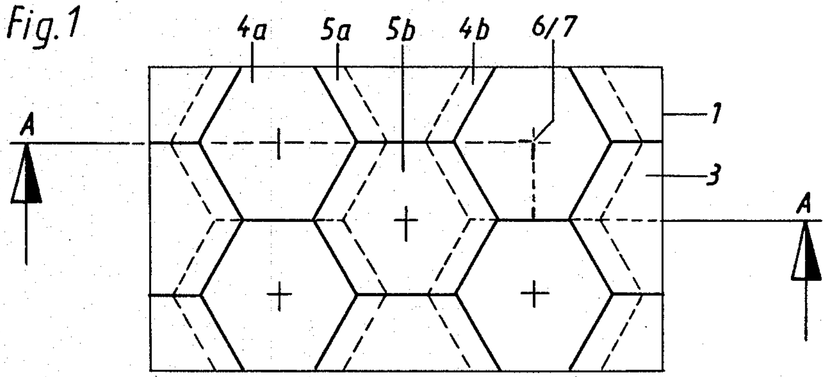
Figure 2:
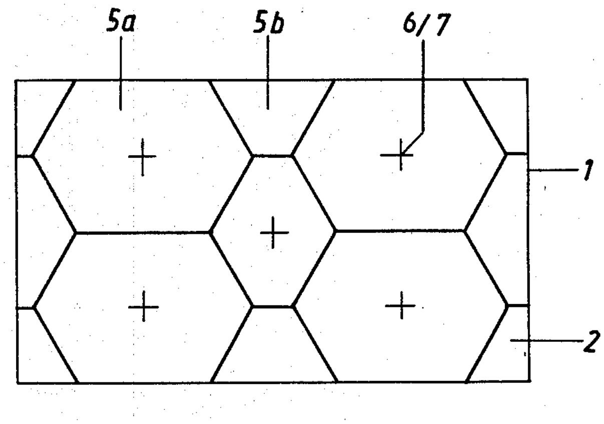
Figure 3:
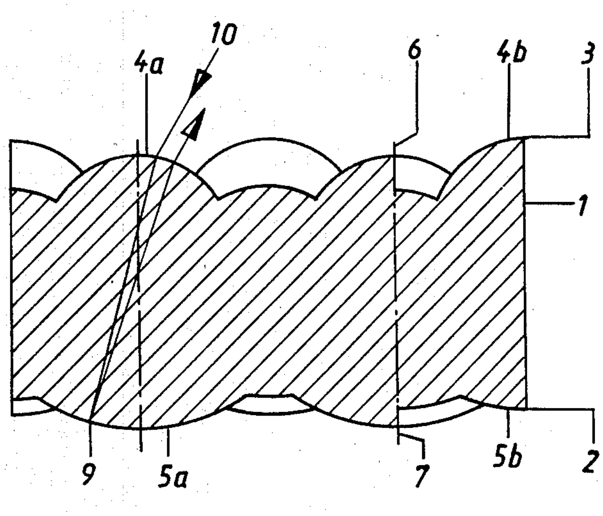
Figure 4:
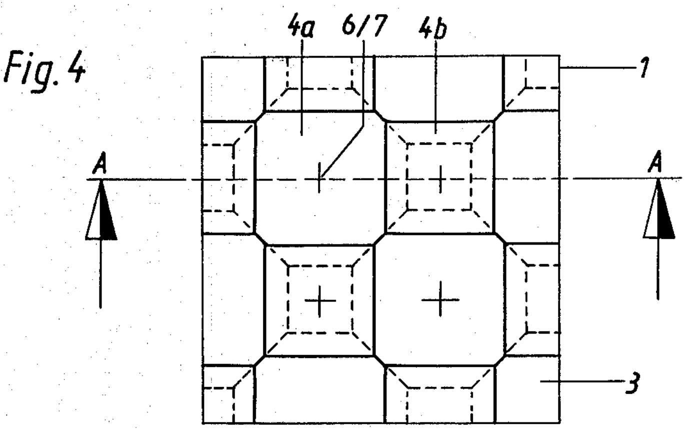
Figure 5:
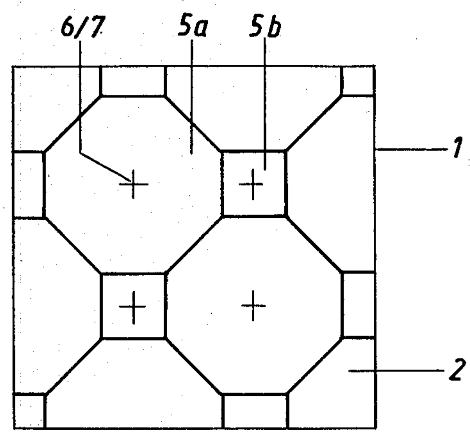
Figure 6:
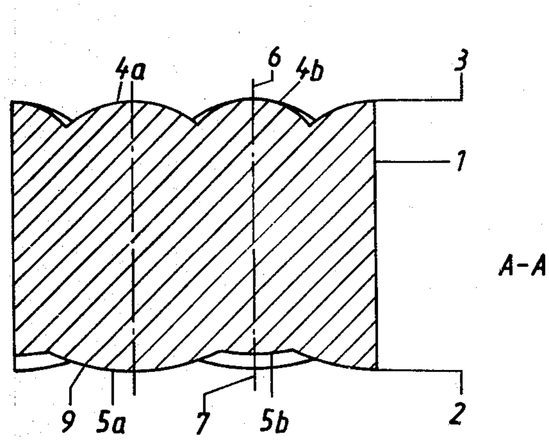

In the case of the reflection surfaces shown in FIG. 2, the reflection surfaces 5a are larger than the reflection surfaces 5b. In the case of optically equal light incidence surfaces a step necessarily results between the reflector surfaces due to the optical system applied. This step 11 is shown in FIG. 7.

If desired, this step may, however, be avoided by embodying the associated light incidence surfaces so as to have a smaller radius of curvature. This is dash-lined in FIG. 7.

It is also possible to leave the radius of curvature of the light incidence surfaces unchanged and instead to allow the associated light incidence surfaces to protrude. The vertices of the light incidence surfaces are then no longer in the same plane.

Due to the above-mentioned variation of the radii of curvature of every second light incidence surface, the split-image of the light incidence surfaces are no longer alike; instead, differently embodied light incidence surfaces 4a and 4b are provided.

The examples described illustrate reflection plates with different reflection surfaces 5a, 5b. However, it is also possible to embody the reflector such that more than two, e.g. four, different reflection surfaces are provided.

Particularly suitable as transparent material for the retroreflector plate are synthetic materials, such as polymethylmethacrylate, acrylic glasses, cellulose esters, e.g. cellulose acetate and cellulose acetobytyrate, and polystyrene. One may also consider embodying the retroreflector plate from a plastic film. The expression "plate" is thus also intended to include films.

The thickness of the plate depends fundamentally on the selected division of the curvature of the optical surfaces. The thickness of the plate is preferably in the range of 2 to 10 mm. For reasons of costs, the plates will be embodied so as to be as thin as possible.

The subdivision of the light incidence side of the reflector into individual light incidence surfaces can be varied within extensive limits and dependent on the index of refraction of the material used, on the thickness of the plate and on the desired optical system.

The selected division substantially determines the height of the curved light incidence surfaces. The latter is preferably in the range of 0.5 to 2 mm.

The reflective layer 9 may consist of any suitable reflecting material, in particular silver or aluminium coatings. However, it is preferred to provide the reflective layer in the form of an aluminium foil.

A preferred method for manufacturing the retroreflector plates comprises inserting a metal foil, e.g. an aluminium foil which may, if desired, be coated with transparent plastic, into a form tool, for instance an injection moulding tool. Subsequently, the plastic for manufacturing the plate is inserted into the form tool. Then, the forming out of the plastic plate along with the metal foil and the uniting of the inserted plastic with the metal foil take place simultaneously at a raised temperature.

In accordance with an alternative preferred embodiment, the retroreflector plates may be manufactured, starting with a plastic band or strip with enclosed or united metal foil. This band or strip is rendered workable by the application of heat and is formed out by stamping in a suitable form tool.

A further method comprises forming out the plates from transparent plastic by means of injection moulding and subsequently providing them with a reflective layer, for instance by applying aluminium in a high-vacuum.

What is claimed is:

1. A retroreflector plate, comprising a transparent plate with a reflective rear side, the front side of which comprises adjacently disposed, curved light incidence surfaces, and the rear side of which comprises adjacently disposed, curved reflection surfaces, in which case the optical axis of each individual light incidence surface coincides with the optical axis of a respective reflection surface, wherein the outlines of said reflection surfaces and their respective light incidence surfaces in each case substantially comprise the same surface content, while having different contour shapes, when said light incidence surfaces or said reflection surfaces are projected perpendicular and parallel onto the plate surface, as the plane of horizontal projection.

2. The retroreflector plate of claim 1, wherein the optical axes are disposed at an angle to the perpendicular to said retroreflector plate.

3. A retroreflector plate comprising:
- a transparent plate having a reflective rear surface;
- a front surface on said transparent plate having a plurality of curved light-incidence surfaces;
- a plurality of curved reflection surfaces forming said reflective rear surface;
- said curved reflection surfaces comprised of at least two reflection surfaces having outlines defining surface areas different from one another and different from the surface area defined by the outline of said curved light-incidence surfaces.

4. The retroreflector plate of claim 3 wherein said plurality of curved reflection surfaces are comprised of a plurality of each of two reflection surfaces having different surface areas.

5. The retroreflector plate of claim 4, wherein the sum of said two different surface areas together substantially comprise the same surface area as two respective curved light-incidence surfaces.

6. The retroreflector plate of claims 3, 4 or 5 wherein said curved reflection surfaces have an outer contour shape which is different than the contour shape of said curved light-incidence surfaces.

7. The retroreflector plate of claim 3, wherein said plurality of curved reflection surfaces have differing contour shapes.

8. The retroreflector plate of claims 1 or 3, wherein said front surface of said transparent plate is fully covered with said curved light-incidence surfaces.

9. The retroreflector plate of claims 1 or 3, wherein said reflective rear surface of said transparent plate is fully covered with said curved reflection surfaces.

10. The retroreflector plate of claims 1 or 3, wherein said front surface of said transparent plate is fully covered with said curved light-incidence surfaces and said reflective rear surface of said transparent plate is fully covered with said curved reflection surfaces.

11. The retroreflector plate of claims 1 or 3, wherein said plurality of light-incidence surfaces comprise surfaces having different radii of curvature.

12. The retroreflector plate of claims 1 or 3, wherein said plate comprises light-incidence surfaces having two different surface areas.

13. The retroreflector plate of claims 1 or 3, wherein said curved light-incidence surfaces have outlines when projected perpendicular and parallel onto the plate surface as the plane of horizontal projection displaying a contour shape selected from the group consisting of hexagonal, square and rectangular shapes.

14. The retroreflector plate of claims 13, wherein the corners of said curved reflection surfaces are rounded off.

15. The retroreflector plate of claims 1 or 3, wherein said curved reflection surface displays an outline of a rectangular shape.

16. The retroreflector plate of claims 1 or 3, wherein said transparent plate comprises a plastic sheet.

* * * * *